United States Patent [19]

Naito et al.

[11] Patent Number: 5,153,149

[45] Date of Patent: Oct. 6, 1992

[54] INJECTION APPARATUS HAVING A CHECK VALVE ABNORMALITY DETECTOR

[75] Inventors: Hideo Naito, Hino; Masao Kamiguchi, Oshino, both of Japan

[73] Assignee: Fanuc Ltd., Minamitsuru, Japan

[21] Appl. No.: 692,978

[22] Filed: Apr. 29, 1991

Related U.S. Application Data

[63] Continuation of Ser. No. 362,408, filed as PCT/JP88/01187, Nov. 24, 1988, abandoned.

[30] Foreign Application Priority Data

Dec. 25, 1987 [JP] Japan ............................ 62-327518

[51] Int. Cl.⁵ ............................................ B29C 45/77
[52] U.S. Cl. .................................... 425/136; 425/145; 425/170; 425/562; 425/563
[58] Field of Search ............... 425/136, 145, 149, 151, 425/169, 170, 171, 562, 563

[56] References Cited

U.S. PATENT DOCUMENTS

| 4,718,841 | 1/1988 | Kiya ................................... 425/149 |
| 4,828,473 | 5/1989 | Otake et al. ......................... 425/145 |
| 4,851,170 | 7/1989 | Shimizu et al. ..................... 425/149 |

FOREIGN PATENT DOCUMENTS 227316 9/1988 Japan.

*Primary Examiner*—Tim Heitbrink
*Attorney, Agent, or Firm*—Staas & Halsey

[57] ABSTRACT

An injection apparatus of an injection-molding machine is described, including a servomotor for screw rotation including a pulse coder, the motor being driven in accordance with the difference between a command output from a control section of the injection-molding machine and an output from the pulse coder, thereby rotating a screw. During injection and pressure hold processes in which the motor is rendered nonoperative, the screw rotates as molten resin flows backward, if a check valve attached to the screw does not function normally, and this situation is detected as an abnormality of the check valve by a control section.

2 Claims, 3 Drawing Sheets

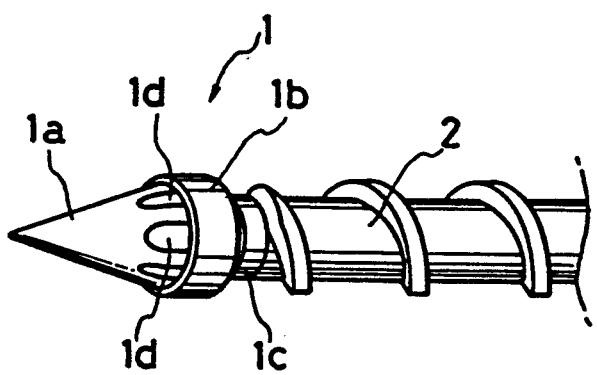
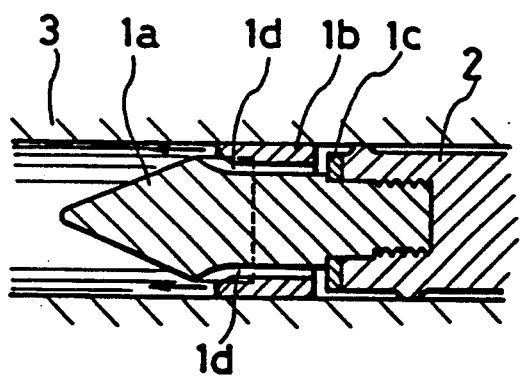
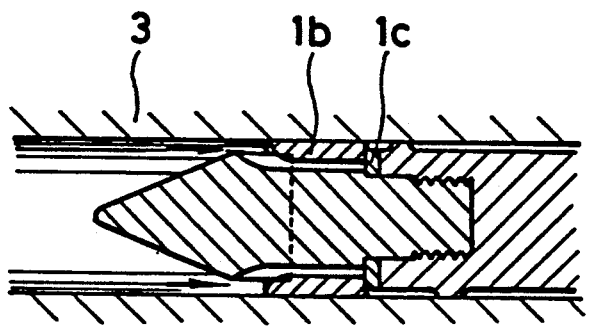

"INJECTION APPARATUS HAVING A CHECK VALVE ABNORMALITY DETECTOR

This application is a continuation of application Ser. No. 07/362,408, filed as PCT/JP88/01187, Nov. 24, 1988, now abandoned.

BACKGROUND OF THE INVENTION

The present invention relates to an abnormality detector of an injection apparatus for detecting an abnormal state of the injection apparatus, especially an abnormal state of a screw.

In an injection-molding machine, a substantial reaction force from molten resin compressed by means of a screw acts on the tip end of the screw during an injection and pressure hold operation, and the molten resin reversely flows along a groove of the screw. A check valve is generally used to prevent this. For example, the check valve includes a screw body movably disposed in a cylinder, a screw head mounted integrally on the tip end of the screw body, a ring-shaped spacer fixed to the tip end face of the screw head, and a ring fitted on the screw head and movable toward and away from the spacer along the screw head in a manner such that the outer peripheral surface of the ring is in contact with the inner peripheral surface of the cylinder.

During a metering process, the ring is separated from the spacer, and molten resin metered by means of the screw body, in rotation for a retreat, is delivered forward through a gap which is defined by the inner peripheral surface of the cylinder and a notch portion formed on the outer peripheral surface of the screw head, and opens at both ends. During injection and pressure hold, on the other hand, the ring pushed back by the reaction force of the compressed molten resin is pressed against the spacer to close the spacer-side open end of the gap, thereby preventing the molten resin from reversely flowing.

If a molding operation is performed for a long period of time, with use of a resin mixed with glass fibers, and the like, or other high-rigidity resins, wear is produced between the sliding contact surfaces of the ring of the check valve and the cylinder. If the screw is rotated or moved before the cylinder is fully heated, moreover, the check valve may possibly be rendered immovable in the cylinder or broken by the solidified resin remaining in the cylinder.

In such a case, the molten resin reversely flows during the injection and pressure hold, so that normal molding operation cannot be effected, and resulting products are subject to "shrink marks" or variation in size. If a high-pressure injecting operation is started without noticing an extreme damage to the check valve, moreover, the molten resin may possibly reversely flow in bulk, and escape from a hopper, or the like, into which pellets are introduced, thereby entailing a very dangerous situation.

In order to prevent such an accident, therefore, it is desired that the check valve should be inspected periodically. To attain this, however, the screw must be removed, thus requiring a very troublesome amount of work. If defective molding is caused by wear of the check valve, furthermore, it is very difficult to detect the cause.

SUMMARY OF THE INVENTION

The object of the present invention is to provide an abnormality detector of an injection apparatus, which automatically detects an abnormal state of a screw or a check valve attached to the tip end of the screw.

In order to achieve the above-mentioned object, the present invention includes means for detecting a torque acting on a screw during injection and pressure hold, and means adapted to detect the occurrence of an abnormal state when the torque detected by the torque detecting means deviates from predetermined permissible limits, during the injection and pressure hold.

As mentioned above, according to the present invention, since wear, deficiency, or other abnormal state of the check valve at the tip end of the screw can be automatically detected during the molding operation, the molten resin can be prevented from reversely flowing during injection and pressure hold, so that the resulting products do not have "shrink marks" or vary in size due to lowering of resin pressure. Moreover, the operator cannot start high-pressure injecting operation without noticing a deficiency, if any, of the check valve, so that the molten resin can be prevented from reversely flowing and escaping. Thus, the safety of the molding operation is improved. Furthermore, since it is unnecessary to remove or disassemble the cylinder, screw, and other mechanical parts in identifying wear or deficiency of the check valve, inspection processes for maintenance are simplified, so that the running cost performance of the injection-molding machine can be improved.

BRIEF DESCRIPTION OF THE DRAWINGS

FIG. 3 is a partial perspective view showing a check valve shown in FIG. 1;

FIG. 4 is a partial longitudinal sectional view for illustrating the operation of the check valve in a metering process; and FIG. 5 is a view similar to FIG. 4, for processes of injection and pressure hold.

DETAILED DESCRIPTION OF THE PREFERRED EMBODIMENTS

Figure 1:
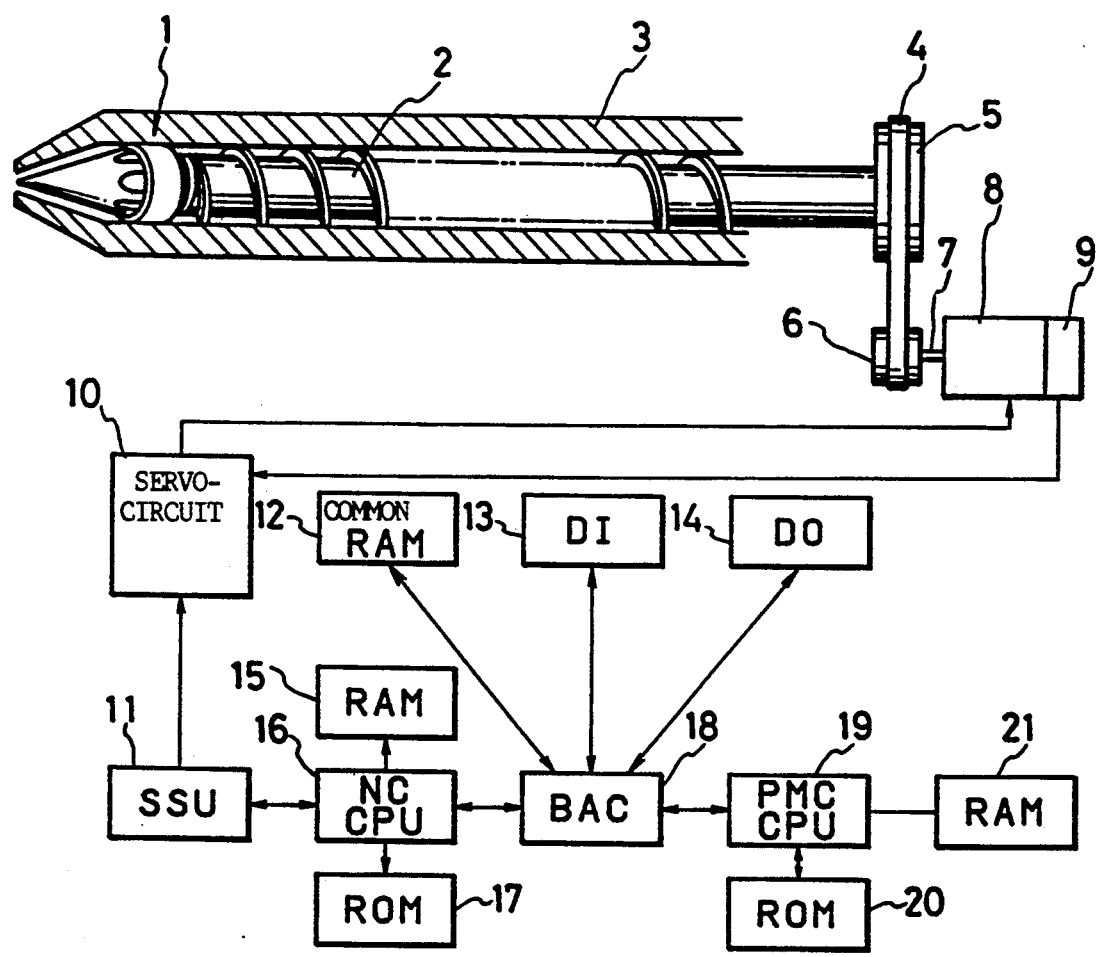
FIG. 1 is a schematic view, partially a block diagram, showing an injection-molding machine mounted with an abnormality detecting apparatus according to an embodiment of the present invention.

In FIG. 1, a motor-operated injection-molding machine has a screw body 2 disposed in a cylinder 3, and a conventional check valve 1 shown in FIG. 3 is attached to the tip end of the screw body 2 so as to be rotatable integrally with the body. The check valve 1 includes a screw head 1a with notch portions 1d on the outer peripheral surface thereof, a ring 1b, and a spacer 1c. During a metering process, the ring 1b is separated from the spacer 1c to allow molten resin to flow (FIG. 4). During injection and pressure hold, the ring 1b is pressed against the spacer 1c to prevent a counter flow of the resin (FIG. 5). The screw body 2 is coupled to a servomotor 8 for screw rotation through a motor pulley 6 fixed to an output shaft 7 of the servomotor 8, a belt 4, and a driving pulley 5 mounted on the proximal end of the screw body 2. FIG. 1 shows only those components which are related to a screw rotating axis of the injection-molding machine. As regards an injection axis, clamp axis, ejector axis, etc., the apparatus is constructed in the same manner as a conventional one.

A control section of the injection-molding machine comprises a microprocessor (hereinafter referred to as NCCPU) 16 and a CPU 19 for a programmable controller (hereinafter referred to as PMCCPU). The PMCCPU 19 is connected with a ROM 20 which stores a sequence program for controlling the sequence operation of the injection-molding machine, etc. and a RAM 21 utilized for temporary storage of data, and the like. The NCCPU 16 is connected with a ROM 17 which stores a control program for generally controlling the injection-molding machine. The NCCPU 16 is also connected, through a servo-interface 11, with servo-circuits 10 each of which controls the drive of the servomotor for a corresponding one of various axes, such as the injection axis, clamp axis, screw rotating axis, ejector axis, etc. FIG. 1 shows only the servomotor 8 for screw rotation, among other servomotors. The servomotor 8 is fitted with a pulse coder 9 for detecting the rotational position of the motor, the pulse coder being connected to the servo-circuit 10 so that its output signal is delivered to an error register in the circuit 10.

Numeral 12 denotes a nonvolatile common RAM which includes a memory section for storing an NC program for controlling various operations of the injection-molding machine and other programs, and a memory section for various set values, parameters, and macro-variables. Numeral 18 denotes a bus arbiter controller (hereinafter referred to as BAC), which is bus-connected with the NCCPU 16, the PMCCPU 19, the common RAM 12, an input circuit 13, and an output circuit 14. Buses used are controlled by means of the BAC 18. Further, the BAC 18 is connected with such an element (not shown) as a manual data input device (hereinafter referred to as CRT/MDI) with a CRT display unit for inputting and displaying various data. Numeral 15 denotes a RAM which is bus-connected to the NCCPU 16, and is utilized for temporary storage of data, and the like.

In the injection-molding machine constructed in this manner, in accordance with the NC program in the common RAM 12 for controlling the various operations of the injection-molding machine and the sequence program stored in the ROM 20, the PMCCPU 19 performs sequence control and the NCCPU 16 distributes pulses to the servo-circuit 10 for each axis of the injection-molding machine through the servo-interface 11, thereby controlling the injection-molding machine. The servo-circuit 10 for each axis controls the current to be supplied to the servomotor 8, thereby controlling the output torque of the motor, in accordance with an output from the error register indicative of the error value of the present position compared with a command position. The error register subtracts pulses from the pulse coder 9 from the distributed pulses delivered from the NCCPU 16 through the servo-interface 11.

Figure 2:
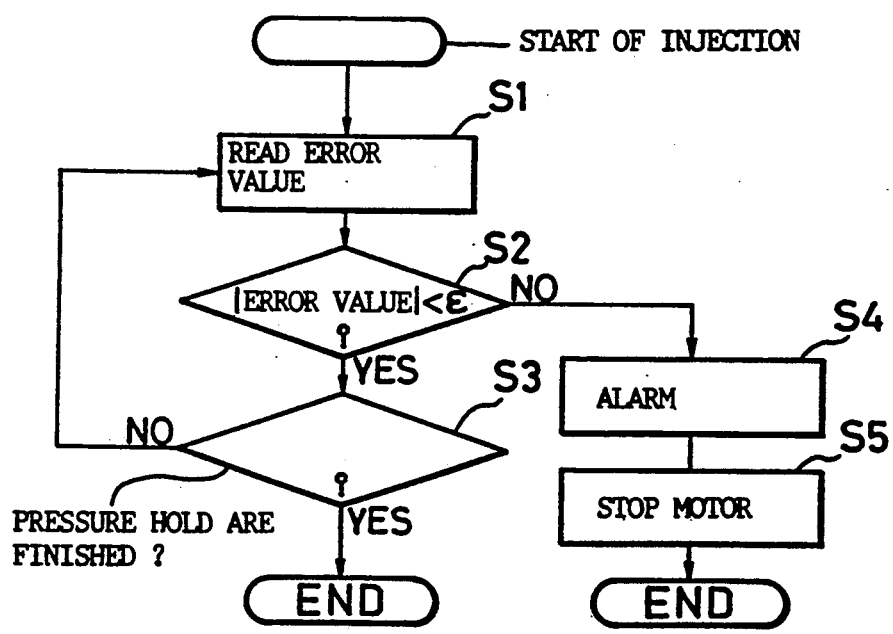
FIG. 2 is a flow chart illustrating processes of abnormality detection executed by means of the apparatus of FIG. 1.

Referring now to FIG. 2, there will be described the operation of the injection-molding machine according to this embodiment, including abnormality detection executed by the PMCCPU 19 with a predetermined period, during processes from the start of injection to the end of pressure hold.

When the injection is started, the NCCPU 16 reads an error value, i.e., the value in the error register in the servo-circuit 10 of the servomotor 8 for screw rotation, through the servo-interface 11 with a predetermined period, and causes the common RAM 12 to store the error value. The PMCCPU 19 reads the error value temporarily stored in the common RAM 12, and determines whether this value is within predetermined permissible limits $\epsilon$ (steps S1 and S2). If the error value is within the predetermined permissible limits $\epsilon$, the check valve 1 is regarded as normal, and the program proceeds to step S3. Thereupon, whether a hold end signal is already inputted, that is, whether the cycle processes from the start of injection to the end of pressure hold are finished, is determined. If the pressure hold is not finished, the program returns to step S1, whereupon a monitor loop consisting of steps S1, S2, and S3 is executed to continue monitoring the error value.

During the injection and pressure hold, the drive of the servomotor 8 for screw rotation is stopped, that is, the NCCPU 16 is not distributing the pulses to the error register in the servo-circuit 10 of the servomotor 8, so that the value of a movement command for the servomotor 8 is "0". If the screw 2 does not rotate, therefore, the value in the error register in the servo-circuit 10, i.e., the error value, is "0". If the check valve 1 is subject to wear or deficiency, however, the molten resin compressed by means of the screw 2 during the injection and pressure hold reversely flows along a spiral groove defined by the cylinder 3 and the screw 2, so that a torque in the opposite direction to that for the metering is produced in the screw 2. This torque is transmitted to the motor shaft 7 through the driving pulley 5, belt 4 and motor pulley 6 to create a rotatory displacement in the servomotor 8, so that the pulse coder 9 detects this rotatory displacement, and the error value of the present position compared with a servomotor stop position (i.e., command position at the end of metering) is collected in the error register of the servo-circuit 10. This error value is stored in the common RAM 12. If the error value deviates from the permissible limits $\epsilon$, it is detected as the abnormality of the check valve 1 by the determination process in step S2. At this time, the PMCCPU 19 delivers an alarm through the BAC 18 to cause the CRT/MDI, or the like, to make an abnormality indication, thereby warning the operator that the check valve 1 is out of order. Further, the drive output of the servomotor for the injection axis is stopped to interrupt the injection and pressure hold operation (step S5).

The motor-operated injection-molding machine has been described above. In the injection-molding machine of this type, various hardware elements to serve as torque detecting means (error value detecting means) for detecting the torque of the screw and abnormal state detecting means (error value discriminating means) are previously provided as a control device for the injection-molding machine. Thus, the detection can be achieved at very low cost without furnishing a new, special detecting device, or the like.

In the embodiment described above, moreover, whether the torque acts on the screw during the injection and pressure hold is determined on the basis of the value in the error register in the servo-circuit, i.e., the error value. Alternatively, however, whether the check valve 1 functions normally may be determined by detecting the driving torque of the servomotor for screw rotation. If the value (error value) in the error register in the servo-circuit 10 increases as the screw 2 rotates during the injection and pressure hold, servomotor 8 is driven so as to reduce the error value to zero, and driving current flows in accordance with the error value. Accordingly, malfunctioning of the check valve 1 may be detected when the driving current exceeds a predetermined value.

Even in a hydraulic injection-molding machine, an incremental encoder, or the like, may be attached to a rotating member of a power transmission mechanism to detect the rotatory displacement so that the pulse output of the encoder is monitored during the processes from the start of injection to the end of pressure hold, provided that the injection-molding machine uses an electric motor for screw rotation or is constructed so that the screw is rotated by power from an oil hydraulic motor transmitted through a gear mechanism.

We claim:

1. An injection apparatus having a check valve abnormality detector, said injection apparatus, comprising:
    a screw for injecting resin, said screw being rotatably driven by drive means;
    a check valve mounted for rotation with the screw;
    means for storing predetermined permissible limits of rotary torque exerted by the resin on the screw;
    torque detecting means, connected to the drive means, for detecting an actual rotary torque exerted by the resin on the screw during an injection and pressure hold;
    means for detecting an occurrence of abnormality of said check valve, when the rotary torque detected by said torque detecting means deviates from the predetermined permissible limits, during the injection and pressure hold, said occurrence of abnormality being indicative of check valve malfunction;
    means for indicating to an operator of the injection apparatus occurrence of the abnormality; and
    means for stopping the drive means to interrupt the injection and pressure hold upon detection of the abnormality.

2. The injection apparatus according to claim 1, wherein said screw further comprises:
    a screw body, said screw being located so as to be subjected to the torque as molten resin flows backward, even when said drive means is in a nonoperating state, if said check valve does not function normally, said torque detecting means detects the torque acting on said screw when said drive means is nonoperating, thereby detecting abnormality of said check valve.

* * * * *